United States Patent [19]

Boyko et al.

[11] Patent Number: 4,887,390
[45] Date of Patent: Dec. 19, 1989

[54] POWERED SLIDING DOOR OPENER/CLOSER FOR VEHICLES

[75] Inventors: James G. Boyko, Gorham; Timothy J. Farrar, Buxton; Stephen B. Peterson, Cape Elizabeth, all of Me.

[73] Assignee: Masco Industries, Inc., Taylor, Mich.

[21] Appl. No.: 135,133

[22] Filed: Dec. 18, 1987

[51] Int. Cl.[4] .................. E05D 15/10; E05F 15/00
[52] U.S. Cl. ................................ 49/214; 49/280; 49/358; 49/360
[58] Field of Search .............. 49/213, 214, 215, 360, 49/279, 280, 289, 358

[56] References Cited

U.S. PATENT DOCUMENTS

| | | | |
|---|---|---|---|
| 689,767 | 12/1901 | Ware et al. | 49/289 |
| 4,167,833 | 9/1979 | Farina et al. | 49/358 X |
| 4,462,185 | 7/1984 | Shibuki et al. | 49/280 X |
| 4,549,369 | 10/1985 | Foley, Jr. | 49/279 |
| 4,612,729 | 9/1986 | Sato | 49/280 |
| 4,617,757 | 10/1986 | Kagiyama et al. | 49/280 |
| 4,640,050 | 2/1987 | Yamagishi | 49/280 |
| 4,644,692 | 2/1987 | Schindehutte | 49/213 |

Primary Examiner—Philip C. Kannan
Attorney, Agent, or Firm—Lerner, David, Littenberg, Krumholz & Mentlik

[57] ABSTRACT

A door operator for a slide door that is slidingly supported relative to a door opening in a side panel of a vehicle body is disclosed. The door is supported adjacent its forward end on at least one forward guide member and is supported adjacent its rear end on a rear guide member. The guide members guide the door through (i) an initial closing movement generally parallel to the side panel, (ii) a final closing movement generally parallel to the side panel, (iii) at least a portion of its final closing movement generally toward the plane of the door opening, and (iv) at least a portion of its initial opening movement generally away from the plane of the door opening. The door operator comprises means including a cable member coupled to the rear end of the door for driving the door along the guide members to thereby move the door through its initial and final opening and closing movements. When used as part of a system, the powered sliding door operating system also includes a clamping means including a rotatable striker plate mounted on the vehicle body and having an eccentrically mounted striker pin thereon engagable by a latch bolt member on the door for clamping the door to the vehicle body with the door in a finally closed position in the door opening.

20 Claims, 10 Drawing Sheets

POWERED SLIDING DOOR OPENER/CLOSER FOR VEHICLES

BACKGROUND OF THE INVENTION

This invention relates to powered sliding door operating systems for vehicles and, more particularly, to powered sliding door operating systems for van type vehicles having a door opening in a side wall of the van, wherein the sliding door is moved generally parallel to the van side wall during its initial closing movement and for a major portion of its full closing movement, as well as during a major portion of its full opening movement, including its final opening movement, and wherein the sliding door moves generally toward and generally away from the plane of the door opening in its respective final closing and initial opening movements, so as to be flush with the side wall when fully closed and to be alongside of and parallel to the side wall, to the rear of the door opening, when fully opened.

In sliding door systems of the foregoing type, upper and lower forward guide rails ar attached to the top and bottom portions, respectively, of the door opening, and a rear guide rail is attached to the exterior of the side wall, at an elevation that is approximately midway between the elevation of the upper and lower forward guide rails. The respective forward end portions of the various guide rails are curved inwardly of the body of the van, and bracket and roller assemblies fastened to the respective upper and lower forward ends of the sliding door and to an intermediate position at the rear end of the sliding door are slidingly supported in the guide rails to guide the door through its opening and closing movements.

The various portions of the movements that sliding doors of vans undergo during opening and closing thereof have different power requirements Thus, the initial door closing movement and a major portion of the door closing movement that follows it is a high displacement/low force traversing movement, during which little force is required to achieve large movements of the door since only frictiomal resistance and grade-caused resistance, if any, must be overcome. Similarly, the final opening movement and a major portion of the opening movement which precedes it is a high displacement/low force traversing movement for the same reasons. On the other hand, the final closing movement of the door is a low displacement/high force motion, since at this time an elastomeric weather seal which surrounds the door opening must be compressed and, also, an unlatched latch bolt member carried at the rear end of the door must engage and be rotated to a latched position by a striker pin carried by the van body at the rear end of the door opening.

In manually operated sliding door units for van type vehicles the sliding door is typically moved with great momentum through its closing movement in order to insure that it will fully compress the weather seal strip at the end of such movement and, also, that the latch bolt member will be rotated to its latched position in engagement with the striker pin at such time. Such high momentum movement of the sliding door member presents a significant safety problem with respect to vehicle occupants, who may inadvertently have failed to remove portions of their body from the path of movement of the sliding door.

Various attempts have heretofore been made to mechanize or power the opening and closing movements of sliding doors of van type vehicles. One such attempt is illustrated in U.S. Pat. No. 4,612,729 to Sato. In the Sato patent a motor driven pinion carried by the lower front bracket and roller assembly of the door cooperates with a rack gear carried by the lower front guide rail in the door opening to move the door between its fully open and fully closed positions. In this arrangement, as in the case of the manually operated door discussed above, the rear of the door completes its closure due to a high momentum imparted to it during its closing movement and, therefore, the safety hazard discussed above is not overcome.

Similarly, U.S. Pat. Nos. 4,617,757 to Kagiyama et al and No. 4,640,050 to Yamagishi et al represent additional attempts to mechanize the opening and closing movements of van doors. They employ cable drives which are coupled to the lower front bracket and roller assemblies of the doors to move the doors through their opening and closing movements. Here, again, the systems rely on momentum to complete the door closing movements and, thus, do not satisfactorily meet the safety problems that attend such high momentum closing movements.

U.S Pat. No. 4,462,185 to Shibuki et al represents yet another patent relating to mechanizing the movement of van doors. In this case a friction wheel engages the bottom portion of the door and is employed to drive the door through the major portions of its opening and closing movements parallel to the side wall of the van. In addition a pair of turntable arms pivotably connected end-to-end between the friction wheel and the floor of the door opening is utilized to draw the rear of the door inward against the compression forces of the weather seal strip. While this prior art design presumably operates with lower momentum forces generated during the closing movement than those discussed above, it employs a complicated, costly mechanism which is difficult to originally install and difficult to repair in the event of a breakdown. Moreover, it would be difficult, at best, to retrofit the mechanism shown in this patent to a van type vehicle that was not originally designed to receive it.

In addition to the foregoing prior art attempts to mechanize or power the opening and closing movements of sliding doors of van type vehicles, final closing devices or clamping mechanisms for powering the final low displacement/high force movement of sliding van doors are in current development by the assignee of the present application. Two such low displacement/high force final closing or clamping mechanisms have been shown and described in the co-pending applications of James G. Boyko, Ser. No. 100,940, filed Sept. 25, 1987 and James G. Boyko et al, Ser. No. 119,824, filed Nov. 12, 1987, which applications are assigned to the assignee of the present application. The disclosures of the aforesaid two applications are incorporated by reference into the present application. In each of said co-pending applications a final closing device or clamping mechanism for the sliding door of a van type vehicle is disclosed. In each case the door includes a latch bolt member movable between latched and unlatched positions, and a handle or a lock member movable between open and closed positions. The final closing device or clamping mechanism in each case includes a striker support plate that is mounted on the vehicle body at the rear end of the opening for the sliding door for rotational movement about an axis perpendicular to such plate; a striker pin carried by the striker support plate and projecting therefrom at a position eccentrically offset from the axis; and, means carried by the vehicle body and connected to the striker support plate for rotating the striker support plate. The striker pin is movable between an extended and a retracted position upon rotation of the striker support plate so that when the striker pin is engaged by the latch member bolt the striker support plate is rotated, the sliding door is moved between a partially open position away from the door opening in the vehicle body to a fully closed position in sealing engagement therewith. The later co-pending application in addition to disclosing the foregoing structure includes a crash worthiness feature therein that adds a pawl and ratchet mechanism to the striker support plate rotating means to prevent the rotating means from being reversely rotated in the event high door opening forces are applied to the door from the inside of the vehicle during an accident.

Although the final closing devices or clamping mechanisms of the aforesaid co-pending applications provide excellent final closing operations for sliding van doors, they do not include provisions therein for powering the sliding van doors through the major portions of their opening and closing movements, nor do they include provisions therein for powering the sliding van doors during the late closing movements thereof, to the point where the latch bolt mechanisms of the sliding van doors engage with and close about the striker pins of the clamping mechanisms.

It is, therefore, a primary object of the present invention to provide an improved powered sliding door operator and system for van type vehicles in which the sliding door is moved with low momentum from its fully open position to its nearly closed position, and vice versa, so as to reduce the safety hazards encountered in existing manual sliding doors and existing powered sliding door operators and systems.

Another object of the present invention is to provide a powered sliding door operating system for completely closing the sliding door in a slow controlled manner that obviates the safety hazard involved in rapidly closing or slamming sliding doors according to existing door designs.

It is yet another object of this invention to provide an improved powered sliding door operator and system in which the manual effort required to open and close the sliding door is substantially reduced or eliminated.

A still further object of this invention is to provide for near-normal manual operation of the sliding door in the event the powered sliding door operating system is not functional due to a vehicle accident, system failure, or the like.

An additional object of the present invention is to provide a powered sliding door operating system for van type vehicles which can be actuated either from the vehicle driver's seat or from the sliding door itself.

Further objects and advantages of this invention will become apparent as the following description proceeds.

SUMMARY OF THE INVENTION

Briefly stated and in accordance with one embodiment of this invention, there is provided a door operator for a slide door that is slidingly supported relative to a door opening in a side panel of a vehicle body. The door is supported adjacent its forward end on at least one forward guide member and is supported adjacent its rear end on a rear guide member. The guide members guide the door through (i) an initial closing movement generally parallel to the side panel, (ii) a final opening movement generally parallel to the side panel, (iii) at least a portion of its final closing movement generally toward the plane of the door opening, and (iv) at least a portion of its initial opening movement generally away from the plane of the door opening. The door operator comprises means including a cable member coupled to the rear end of the door for driving the door along the guide members to thereby move the door through its initial and final opening and closing movements.

In accordance with another aspect of the invention there is provided an improved door operating system for a door that is slidingly supported relative to a door opening in a side panel of a vehicle body. The door is supported adjacent its forward end on at least one forward guide member carried by the vehicle body and is supported adjacent its rear end on a rear guide member carried by the vehicle body. The guide members guide the door through (i) an initial closing movement generally parallel to the side panel, (ii) a final opening movement generally parallel to the side panel, (iii) at least a portion of its final closing movement generally toward the plane of the door opening, and (iv) at least a portion of its initial opening movement generally away from the plane of the door opening. The door includes a latch bolt member carried adjacent the rear end thereof and movable between latched and unlatched positions. The door operating system comprises a drive means including a cable member coupled to the rear end of the door for moving the door along the guide members and through the initial and final opening and closing movements, and a clamping means including a rotatable striker plate mounted o the vehicle body and having an eccentrically mounted striker pin thereon engageable by the latch bolt member of the door for clamping the door to the vehicle body with the door in a finally closed position in the door opening.

BRIEF DESCRIPTION OF THE DRAWINGS

While the specification concludes with claims particularly pointing out and distinctly claiming the subject matter regarded as the invention herein, it is believed that the present invention will be more readily understood from the following description, taken in conjunction with the accompanying drawings, in which:

DETAILED DESCRIPTION

Figure 1:
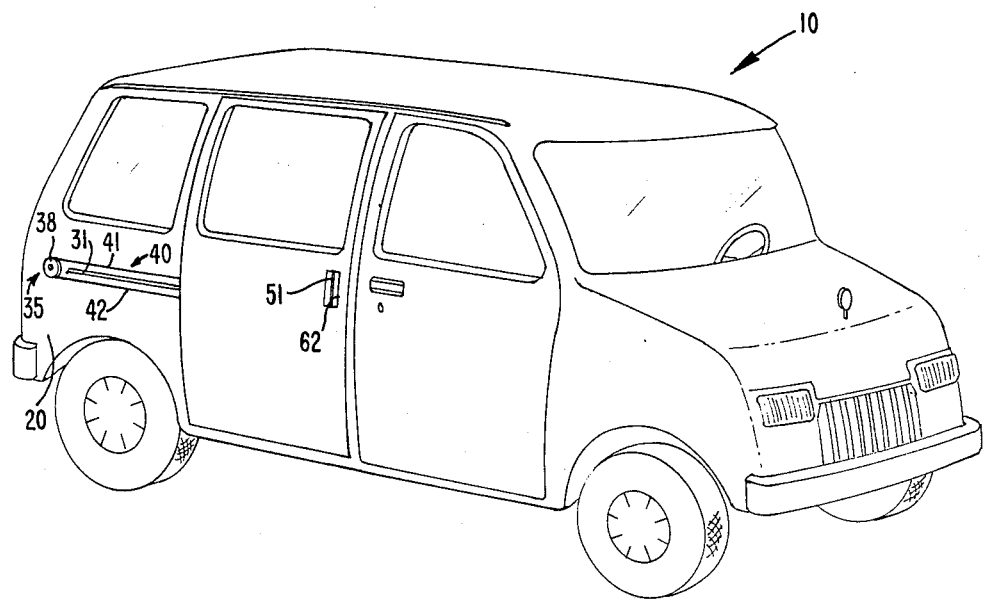
FIG. 1 is a perspective view of a van type vehicle having a powered sliding door operating system therein in accordance with the present invention.

Referring to FIGS. 1-9, wherein a first embodiment of the invention has been illustrated on a van type of vehicle 10, the powered door operator and door operating system of the invention is used to open and close a sliding door 12 of the van. The sliding door 12 supported on the body of van 10 at three points. The first point of support comprises a forward upper bracket and roller assembly, shown generally at 14 (FIG. 8), that includes an arm 15, one end of which is fastened to the upper forward end of door 12 and the other end of which carries one or more rollers 16 on its upper surface. Rollers 16 engage and ride in a curved upper forward guide rail or member 17 that is fixedly carried on the lower surface of a vehicle body member 18 that surrounds a door opening, shown generally at 19, formed in a side wall 20 of the van.

The second point of attachment comprises a forward lower bracket and roller assembly, shown generally at 21 (FIG. 2), which includes an arm 22 having one of its ends fixedly attached to the lower forward end of door 12 and one or more rollers 23 carried at the other of its ends. The rollers 23 engage and ride in a curved lower forward guide rail or member 24 that is attached to a vehicle body member 25 that surrounds the lower portion of the door opening 19.

The third point of attachment comprises a rear, midlevel, bracket and roller assembly, shown generally at 26, which includes an arm 27 that has one of its ends fixedly attached to the rear end of door 12 and is pivotly attached at the other of its ends 28 to one end of a link 29. The other end of link 29 carries a plurality of rollers 30. The rollers 30 engage and ride in a curved rear guide rail or member 31 that is carried on the outside of side wall 20, at an intermediate level approximately midway between the levels of the upper and lower guide rails 17 and 24, respectively. The guide members 17, 24 and 31 curve toward the inside of the van 10 adjacent their forward ends.

Figure 3:
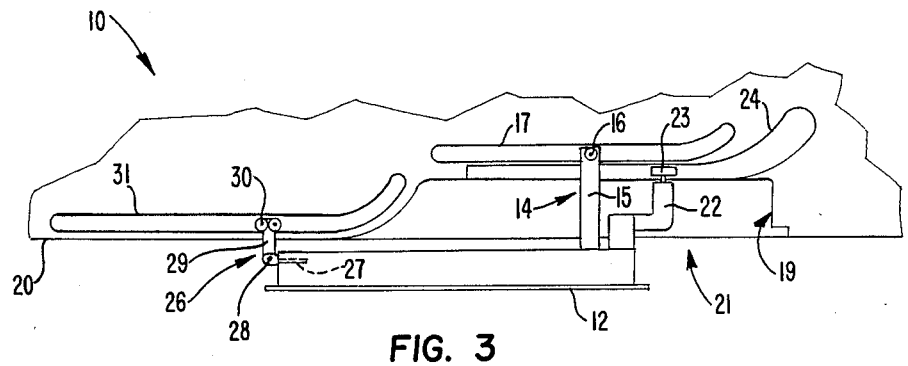
FIGS. 3, 4, and 5 are diagrammatic views, illustrating the path of movement followed by the sliding door relative to its supporting guide rails during closing of the door.
Figure 4:
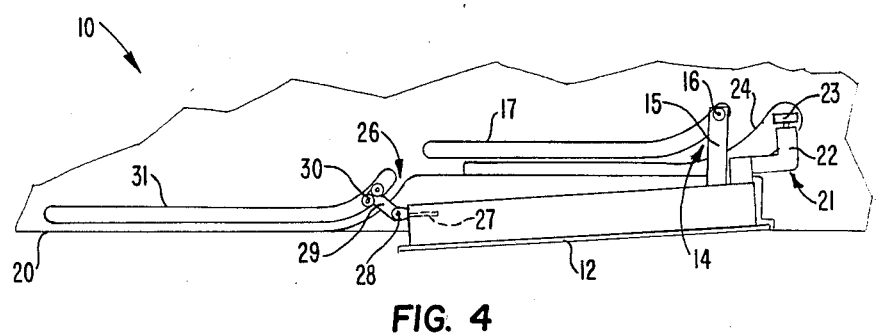
Figure 5:
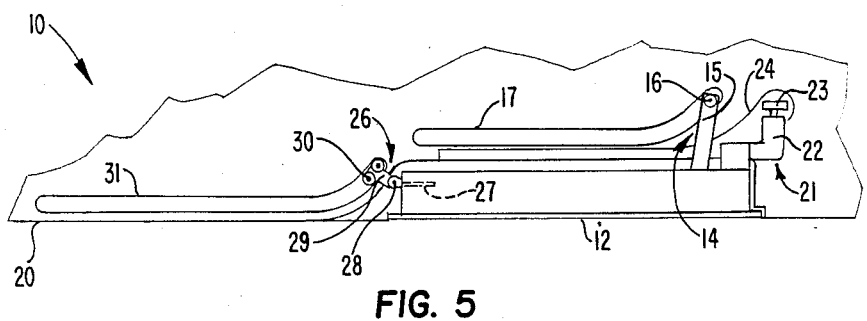

The foregoing three points of support allow the slide door 12 to be slidably moved to and from along the guide members 17, 24 and 31, with the door being guided by the guide members through an initial closing movement and a final opening movement that is generally parallel to the side wall 20 of the van, as shown in FIG. 3, and through final closing and initial opening movements that are respectively generally toward and away from the plane of the door opening, as shown in FIGS. 4 and 5.

Referring to FIG. 3, the fully open position of door 12 occurs when the door is moved fully to the left, or rear, relative to the guide members 17, 24 and 31, at which time the rollers 16, 23 and 30 are at the rear ends of their respective guide members 17, 24 and 31. When the door 12 is then moved to the right, or forward, its movement relative to the side wall 20 is essentially parallel to the side wall for a major portion of its traversing movement towards the door opening 19. As the door approaches the right hand ends of the various guide members 17, 24 and 31, the curved portions of guide members 17 and 24 are initially encountered by the corresponding rollers 16 and 23 so that the forward end of door 12 moves inwardly toward the door opening 19 somewhat prior to the time that the rear end of the door 12 starts moving inwardly. Thus, the forward end of the door 12 engages the weather seal strip in the door frame before the rear end of the door does and a pivoting action of the door then occurs, as may be seen by comparing FIG. 4 with FIG. 5. As the rollers 30 of the rear bracket and roller assembly 26 move through the inwardly curved forward end portion of guide member 31, the final closing movement of door 12 is accompanied by movement of the rear portion of the door into the door opening 19, as shown in FIG. 5.

Referring now more particularly to FIGS. 6-9, a powered door operator, shown generally at 35, which is employed in moving the sliding door through its initial and final opening and closing movements, has there been illustrated. The door operator 35 includes a cable drive motor 2M that is mounted via a bracket 36 to the inside of side wall 20 by screws (not shown). Motor 2M, when energized, rotates a shaft 37 that protrudes through the side wall 20 to the outside surface thereof and has keyed to its outer end a drive pulley 38. Drive pulley 38 is positioned adjacent the rear end of rear guide member 31, and an idler pulley 39 is rotatably mounted on the side wall 20 adjacent to the forward end of rear guide member 31.

A taut cable member, shown generally at 40, having an upper reach 41 and a lower reach 42, is entrained about drive pulley 38 and idler pulley 39, so that rotation of drive pulley 38 causes the upper and lower reaches 41 and 42, respectively, to correspondingly move with the rotation of drive pulley 38. The lower reach 42 of cable member 40 is fastened to the undersurface of link 29 of the rear bracket and roller assembly 26 by means of a clamp member 43 and bolts 44. Accordingly, the movement of lower reach 42 of cable member 40 causes link 29 to move along with the lower reach 42 and this, in turn, causes the rear bracket and roller assembly 26, and the door 12 to which it is fastened, to move along with the lower reach 42. In this manner the door may be moved through various of its opening and closing movements, depending upon the direction of rotation of motor 2M.

Figure 6:
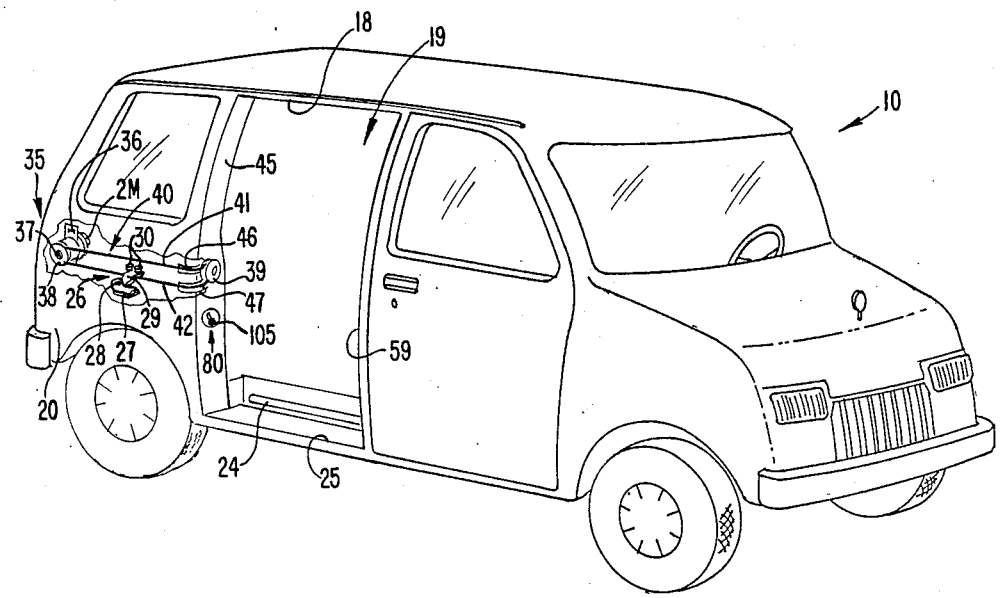
FIG. 6 is a perspective view of the van shown in FIGS. 1 and 2, with the sliding door thereof removed and parts cut away in order to more clearly illustrate an embodiment of this invention in which a cable member is driven by a drive motor that is mounted on a side wall of the van.
Figure 7:
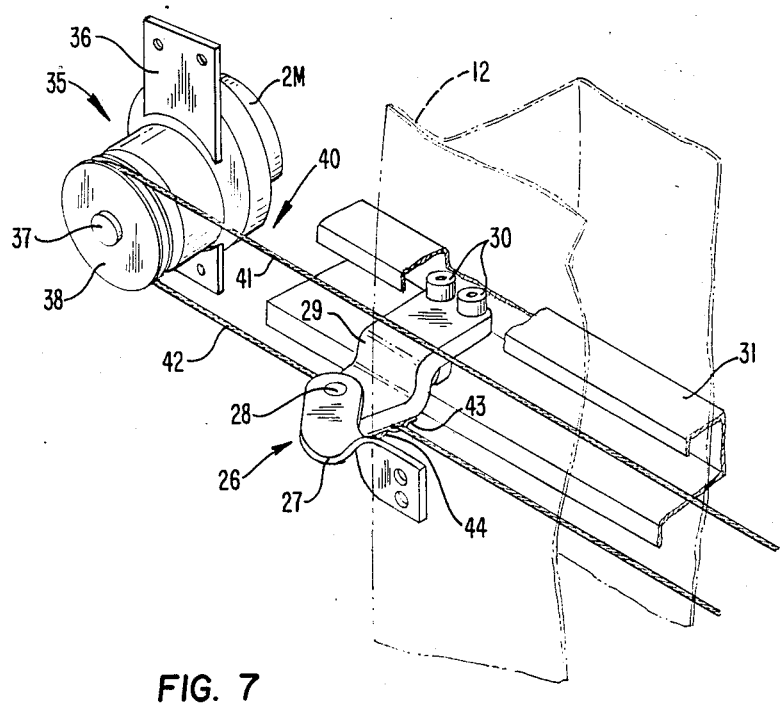
FIG. 7 is an enlarged detailed perspective view of a cable drive mechanism illustrated in FIG. 6, showing the manner in which the cable member is fastened to a rear bracket and roller assembly carried at the rear end of the door.

As best seen in FIG. 6, the idler pulley 39 is mounted for rotation on a vehicle body member 45 that forms the rear end of the door opening 19, and the rotational axis of the pulley 39 forms a high angle, approaching 90 degrees, with respect to the rotational axis of the pulley 38. Accordingly, the upper and lower reaches of cable member 40 must change direction as they pass around the corner of the vehicle body formed by the intersection of vehicle body member 45 and side wall 20. To prevent wear on the metal at the junction of the two members 45 and 20, curved hardened steel wear plates 46 and 47 are fixed to the vehicle body at the intersection of body members 20 and 45, at the points where the upper and lower reaches 41 and 42, respectively, pass around such intersection. Wear plates 46 and 47 smoothly guide the taut reaches of the cable member around the corner and prevent undue wear of the vehicle body material and the cable member at those points.

It should be noted that the movement of the lower reach 42 around the wear plate 47 and toward the pulley 39 is generally inwardly of the door opening 19, and this movement carries the bracket and roller assembly 26 and the rear end of the door 12 along with it. Consequently, during the final closing movement of door 12, the lower reach 42 imparts a low momentum closing force to the door which is directed generally inward. The inward movement of the rear end of the door 12, in turn, is accompanied by an engagement and latching of the latch bolt member carried by the rear end of the door with the striker pin carried by the vehicle body member 45, preparatory to final closing or clamping of the door against the weather seal strip on the door frame, which action will be further described and illustrated in detail hereinafter. It should also be noted that when motor 2M is de-energized and the latch bolt member and striker pin are not in latched engagement, the door 12 may be freely moved manually between its nearly closed position and its fully open position since the motor 2M and cable member 40 add little frictional resistance opposing such movement, and since no provision is made to lock the motor shaft in place when the motor is de-energized.

Figure 2:
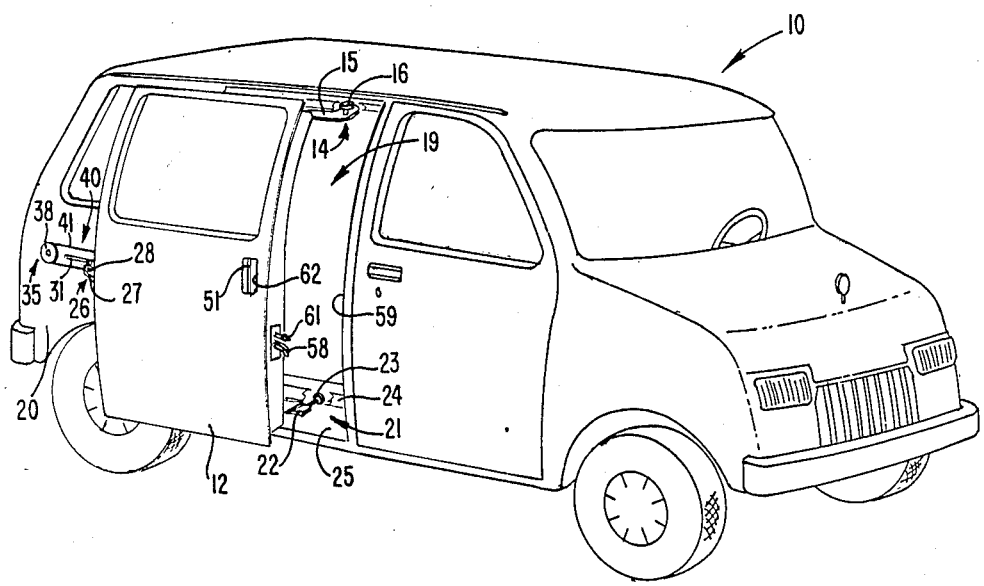
FIG. 2 is a view similar to FIG. 1, showing the sliding door of the van in a partially open position.
Figure 9:
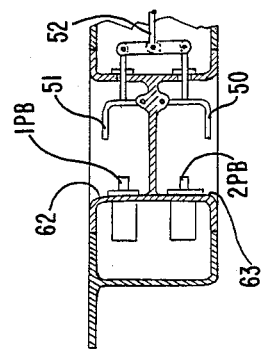
FIG. 9 is a sectional view, taken along the line 9-9 of FIG. 8, showing the locations of push button switches that are used in controlling the closing of the sliding door.
Figure 8:
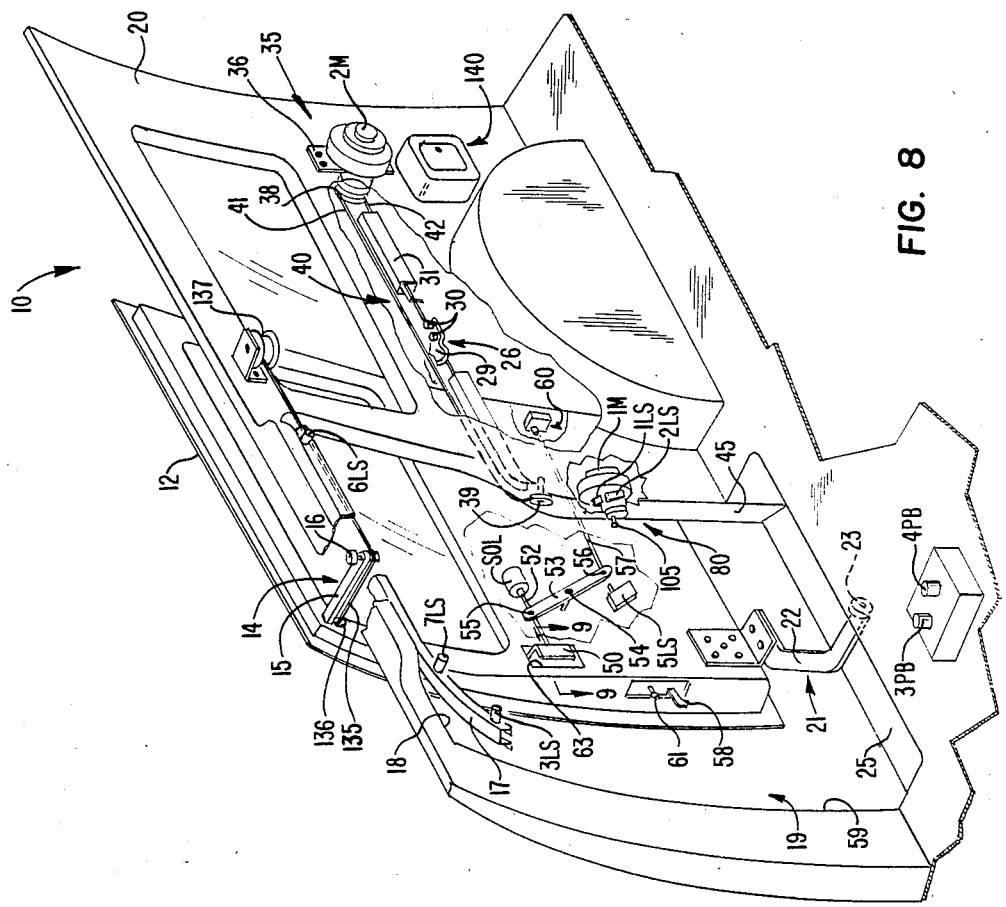
FIG. 8 is a partial, diagrammatic view of the door operating system illustrated in FIGS. 1-7, as viewed from a point inside of the vehicle and showing the door in a partially open position.

As shown most clearly in FIGS. 2, 8 and 9, door 12 is provided with inner and outer handles 50 and 51, respectively, which when pulled to the rear (to the right as viewed in FIG. 8) move a push rod 52 to the rear. The rearward movement of rod 52 can also be initiated by an electrical solenoid SOL the armature of which is carried at the rear end of rod 52. A link 53, which is pivoted to the door at 54 and is pivotally connected at its upper end 55 to the push rod 52, is rotated about its pivot point 54 when the push rod 52 moves rearwardly. The lower end of link 53 is pivotally connected at 56 to a pull rod 57 that is connected to the latch bolt mechanism of the door, shown generally at 60. Accordingly, when either of the handles 50 and 51 is pulled to the rear, or when the solenoid SOL is energized, the pull rod 57 is moved to the left as viewed in FIG. 8, causing the latch bolt mechanism 60 to become unlatched, as will appear in greater detail hereinafter, allowing the door to be either manually or automatically opened. The movement of pull rod 57 to its forward or unlatching position is sensed by a limit switch 5LS which is actuated by the lower end of link 53 and the limit switch, in turn, provides a signal to the electrical circuits that the door handle has been manually or electrically opened. The opening movement of the door handle also opens a forward latch member 58 which engages a suitable latch receiving member (not shown) in a vehicle body member 59 which forms a forward end of the door opening 19. A guide pin 61 carried at the forward end of door 12 is employed to guide the forward end of the door into door frame 59 during closing movement of the door and to that end a conical recess (not shown) is provided in the body member 59. The door handles 50 and 51 are located in respective recesses 62 and 63 (FIG. 9) of the door.

As will appear in greater detail hereinafter, push buttons 1PB, 2PB, 3PB and 4PB are employed in initiating movement of the door 12 amongst its various positions. Push buttons 1PB and 2PB (FIG. 9) are positioned in the door recesses 62 and 63, respectively, and are employed in signalling the electrical circuits, from the location of door 12, to move the door from its open position to its intermediate position and thence to its nearly closed position. Push buttons 3PB and 4PB (FIG. 8) are positioned adjacent to the vehicle driver's seat (not shown). Push button 3PB is employed in connection with opening door 12, and push button 4PB is employed in connection with closing door 12, from the vehicle driver's location.

The various positions of door 12 relative to door opening 19 are sensed by limit switches that are carried on upper forward guide member 17 and are connected into the electrical control circuits of the door operating system. Thus, referring to FIG. 8, limit switch 6LS is carried at the rear end of guide member 17 and is actuated when the door is at its fully open position; limit switch 3LS is carried at the forward end of guide member 17 and is actuated when the door is at its nearly closed (and fully closed) position; and limit switch 7LS is carried at an intermediate position on guide member 17 and is actuated when the door is at its intermediate position.

Figure 10:
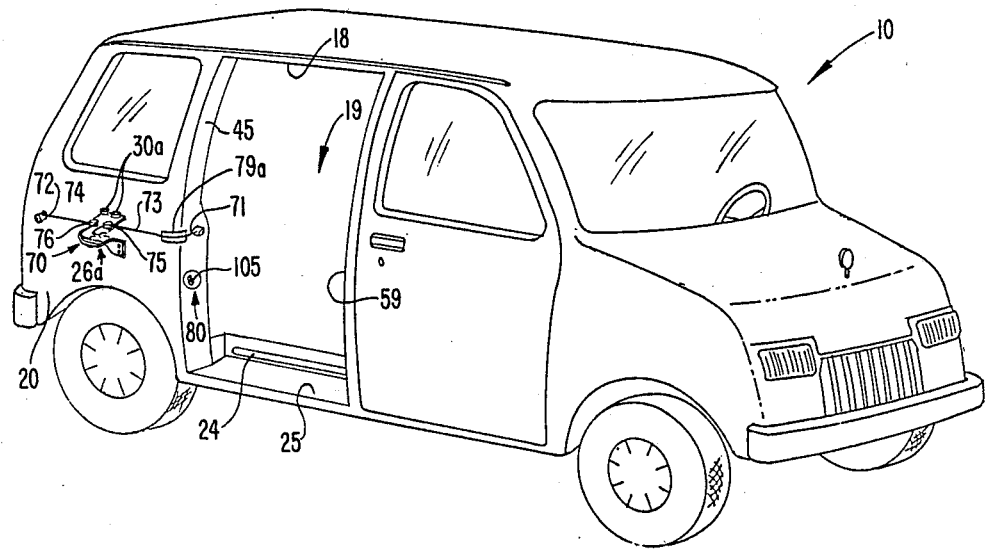
FIG. 10 is a view similar to FIG. 6, showing a portion of an alternate embodiment of the invention in which a cable member that is fixed to the side wall of the van coacts with a drive motor mounted in the sliding door to move the door relative to the side wall.
Figure 11:
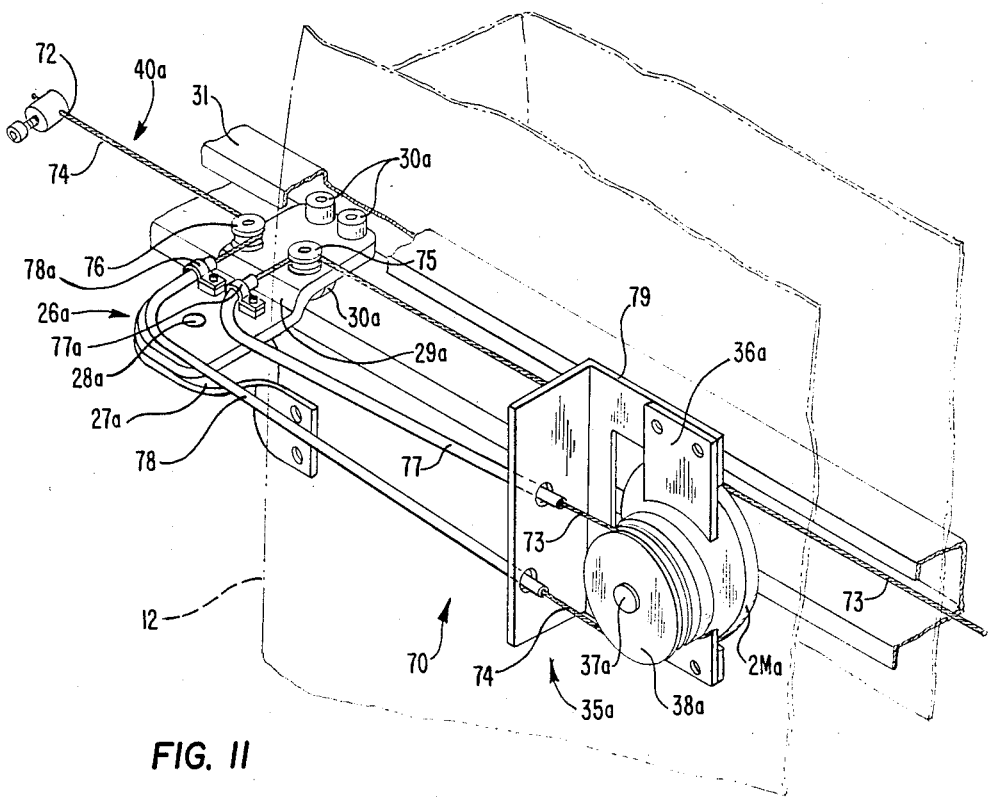
FIG. 11 is a diagrammatic view, on an enlarged scale, of the alternate embodiment of the invention shown in FIG. 10, showing the cable drive motor that is mounted within the body of the sliding door.
Figure 12:
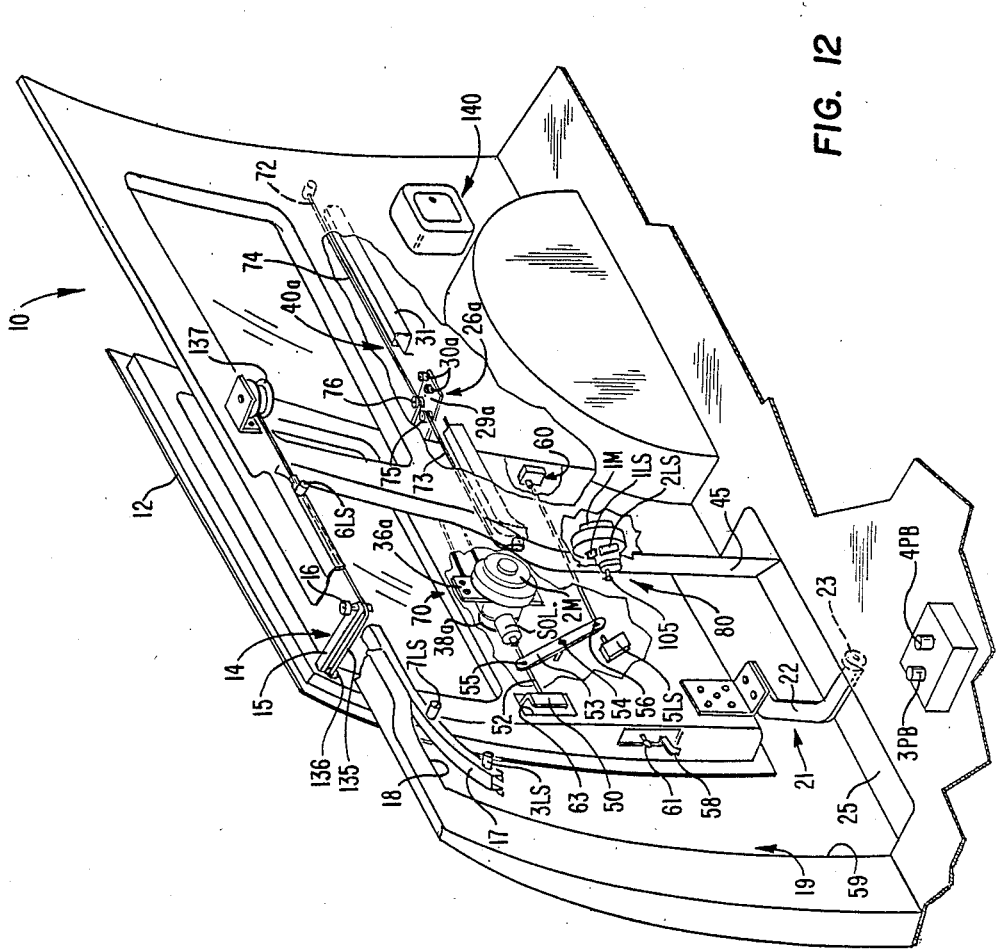
FIG. 12 is a partial, diagrammatic view, similar to FIG. 8, showing the alternate form of the invention as viewed from a point inside the van.
Figure 13:
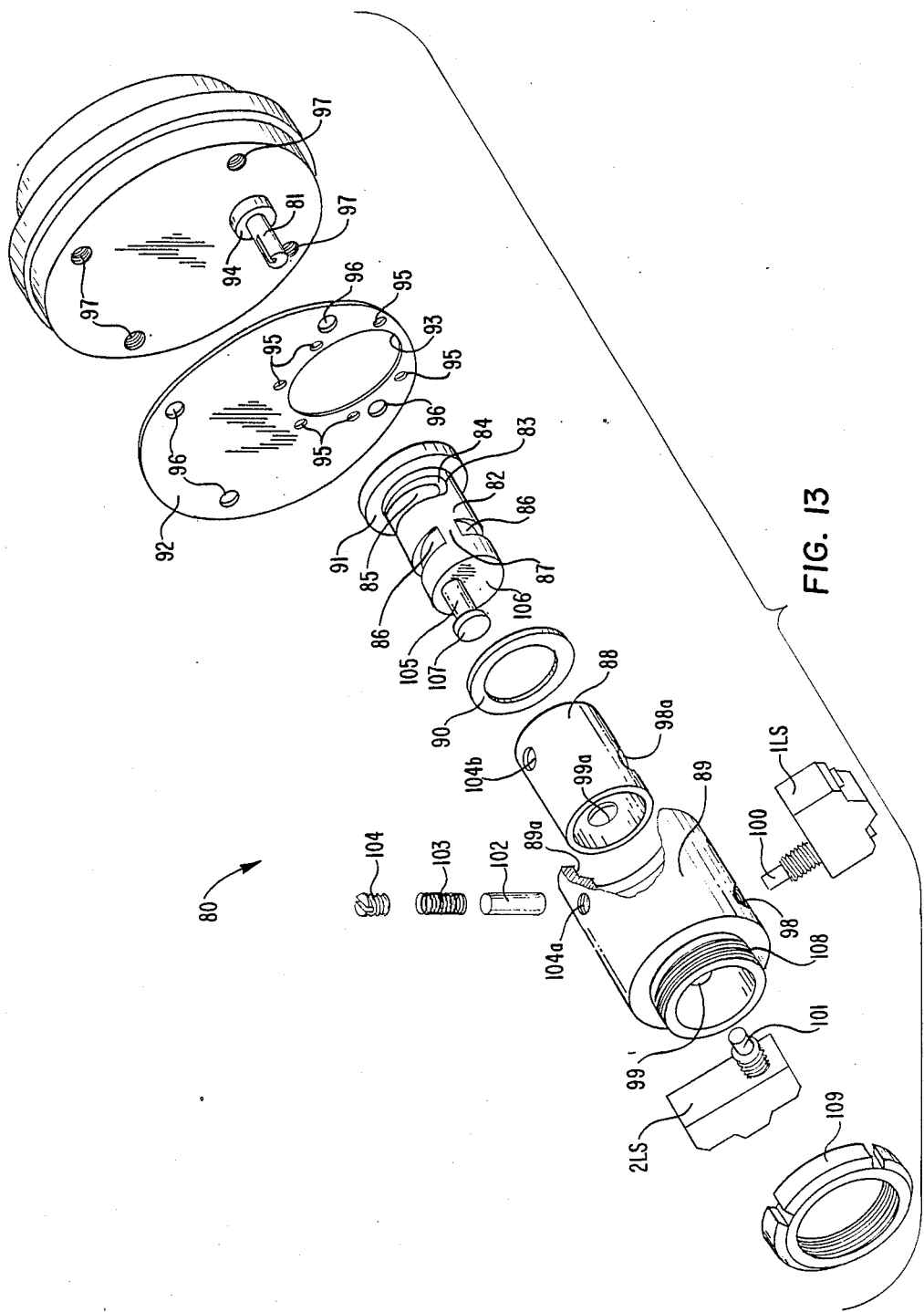
FIG. 13 is an exploded perspective view of a final closure means or clamping mechanism that is employed to move the nearly closed sliding door to its fully closed position against the compression resisting forces exerted by the weather seal strip of the door.

Referring to FIGS. 10–12, an alternate embodiment of the powered door operator has there been illustrated generally at 70. Parts associated with the power door operator 70 of FIGS. 10–12 that are similar to corresponding parts of the powered door operator 35 of FIGS. 1–8 are identified in FIGS. 10–12 by a subscript "a" next to the part number. The alternate powered door operator 70 includes a cable drive motor 2Ma, similar to that described in connection with the embodiment of FIGS. 1–8, which in this case is mounted via a bracket 36a to the inside of door 12 via screws (not shown). Motor 2Ma, when energized, rotates a drive pulley 38a about which a cable member, shown generally at 40a, is entrained. Cable member 40a is provided with a forward end portion 71 that is fastened to the vehicle body member 45 at the rear end of door opening 19 and is provided with a rear end portion 72 that is fastened to the rear portion of the van side wall 20, adjacent the respective forward and rear ends of rear guide member 31.

The cable member 40a includes a forward reach 73 and a rear reach 74 which are entrained about and merge into one at the drive pulley 38a. The forward and rear reaches 73 and 74 pass about and are guided by respective forward and rear idler pulleys 75 and 76 carried by a link 29a during movement of a rear bracket and roller assembly 26a carried by door 12 when motor 2Ma is energized. The major portions of the forward and rear reaches 73 and 74, extending between rollers 75, 76 and drive pulley 38a, are shielded by flexible shrouds 77 and 78, respectively. The rear ends of shrouds 77 and 78 are clamped to link 29a by respective clamps 77a and 78a, and the front ends of shrouds 77 and 78 are supported in a bracket 79 that is fastened to the motor support bracket 36a. The arrangement is such that link 29a can pivot about pivot 28a relative to door support arm 27a during its movement in and relative to rear guide member 31. A curved, hardened steel wear plate 79a (FIG. 10) is provided adjacent the forward end of guide member 31 to facilitate movement of the rollers 30a through the curved portion of guide member 31 without undue wear at the intersection of the body members 20 and 45 and to support the forward reach 73 of cable member 40a at that intersection.

From the foregoing description, it will be understood that when motor 2Ma is rotated in one direction, for example clockwise as viewed in FIG. 11, the forward reach 73 will be shortened and the rear reach 74 will be lengthened, causing door 12 to move toward its closed position (to the right, as viewed in FIG. 11). Conversely, when motor 2Ma is rotated in a counter clockwise direction as viewed in FIG. 11, forward reach 73 will be lengthened and rear reach 74 will be shortened, causing door 12 to move toward its fully open position (to the left as viewed in FIG. 11).

Referring now to FIGS. 8 and 13–19, a final closing device or clamping mechanism, shown generally at 80, is provided for moving the door 12 from its nearly closed position, at which the latch bolt member latches on to the striker pin, to a fully closed position, at which the weather seal strip of the door is compressed, and the door is fully into the door opening and flush with the side wall 20. The final closing device 80 includes a motor 1M having an output shaft 81 on which an enlarged shaft extension or striker shaft 82 is mounted and keyed thereto for rotation therewith. The striker shaft 82 is machined adjacent one end of its outer surface to provide a ratchet tooth 83 having a radially extending face 84. The radially inner and outer ends of the face 84 are connected by a smooth spiral cam surface 85.

The forward end of the outer surface of striker shaft 82 also has a groove 86 machined therein so that a protruding cam surface 87 is provided relative to groove 86 at the outer surface of striker shaft 82. The striker shaft 82 rotates within a bronze bushing 88 that is press fit into an outer housing 89. A thrust washer 90 seats against the rear (right hand as viewed in FIG. 13) end of the bushing 88 in a stepped recess 89a of the housing 89. Washer 90 separates the end of the bushing from a collar or shoulder 91 formed at the rear (right hand as viewed in FIG. 13) end of striker shaft 82.

A bracket plate 92 is utilized to join the motor 1M to the housing 89. Bracket 92 has an opening 93 therein through which the collar 91 freely passes s that the striker shaft 82 abuts against a shoulder 94 on motor shaft 81. The bracket 92 includes a plurality of small bolt holes 95 which align with corresponding threaded holes (not shown) on the back surface of housing 89 to allow the bracket 92 to be rigidly fastened to the rear end of the housing 89 by bolts (not shown). Similarly, the bracket 92 is provided with a plurality of large bolt holes 96 which are in alignment with corresponding threaded bolt holes 97 at the forward end of motor 1M. Bolts (not shown) are employed to fasten the motor 1M to the opposite side of bracket 92 from the housing 89 so that the various parts of the final closing device 80 are firmly joined together.

A pair of limit switches 1LS and 2LS threadedly engage the housing 89 in corresponding threaded openings 98 and 99 thereof. The openings 98 and 99 ar aligned with corresponding openings 98a and 99a in bushing 88 so that actuators 100 and 101 of the respective limit switches 1LS and 2LS ride in the groove 86 of striker shaft 82 and are actuated by the protruding cam surface 87 during rotation of the striker shaft 82, as will appear in greater detail hereinafter.

Figure 14:
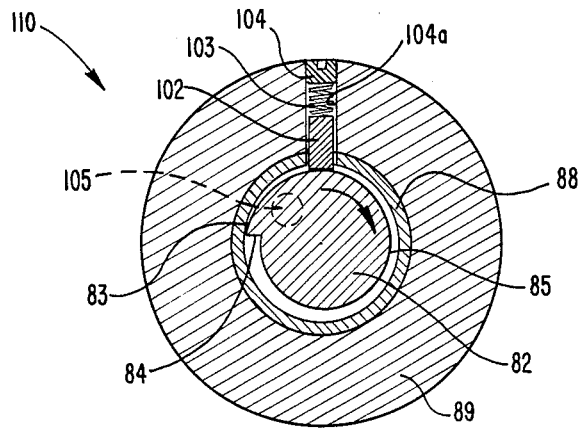
FIGS. 14, 15 and 16 are enlarged sectional views, taken through a mechanism in FIG. 13 for precluding reverse rotation of the striker plate, and showing the relationship of a pawl to a single tooth ratchet wheel thereof when the striker pin is in its extended position, its retracted position, and enroute from its retracted position to its extended position, respectively.
Figure 15:
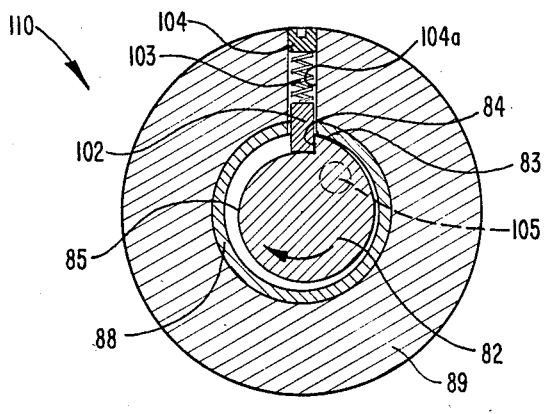

A pawl 102, a spring 103 and a lockbolt 104 are carried in an aperature 104a in housing 89. The aperature 104a is aligned with an aperature 104b in bushing 88 so that the pawl 102 is spring loaded downwardly into engagement with the spiral cam surface 85 on the outer surface of striker shaft 82. During clockwise rotation of striker shaft 82 (as viewed in FIG. 13), the pawl 102 rides up the spiral cam surface 85 until it reaches the top of the tooth 83 and then it drops down into engagement with the radial face 84 of the tooth. This point represents the fully closed or clamping position of the final closing device 80. It is shown in FIG. 15 and it coincides with the actuation of limit switch 2LS by cam 87. The unclamped or open position of the final closing device 80 is illustrated in FIG. 14. It coincides with the actuation of limit switch 1LS by cam 87.

The final closing device 80 is provided with a striker pin 105 which projects axially outwardly from an end surface 106 of the striker shaft 82. The end surface 106 constitutes a striker plate on which the striker pin 105 is eccentrically supported relative to the rotary axis of the shaft extension 82. The end of the striker pin 105 remote from surface 106 is provided with a flange or enlarged head portion 107 thereon for crash worthiness purposes. Preferably, the flange 107 is capable of preventing the latch bolt mechanism 60 on door 12 from axially pulling off of the striker pin during high impact axial loads of at least 3000 lbs. that might occur in an automobile accident.

The end of housing 89 remote from motor 1M is provided with a reduced diameter threaded end portion 108 that is threadedly engaged by mounting nut 109. The end portion 108 is passed through one side of a corresponding opening in the rear body member 45 of the door opening and is bolted thereto by tightly threading the mounting nut 109 onto it from the other side of the body member. A key and slot arrangement (not shown) may be provided to insure that the clamping mechanism housing 89 does not rotate relative to frame member 45.

Figure 16:
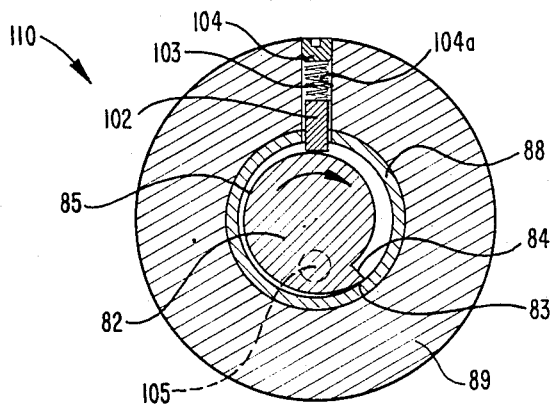
Figure 17:
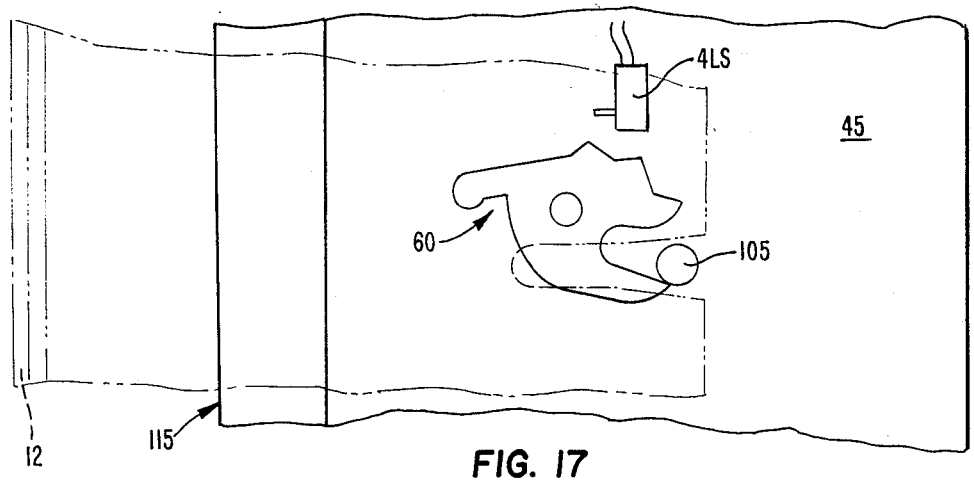
FIGS. 17, 18 and 19 are diagrammatic elevation views, taken through the latch bolt mechanism of the door and the final closing mechanism on the door frame, showing the relationship of the latch bolt member and striker pin to the weather seal strip on the vehicle body during various stages of closing of the door; and, FIG. 20 is a circuit diagram of an electrical system that may be employed in controlling the operation of the powered sliding door operating system.
Figure 18:
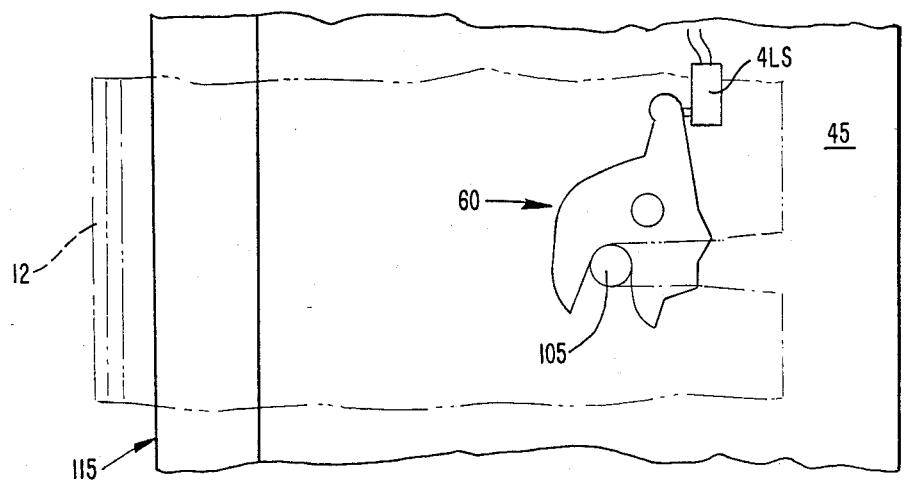
Figure 19:
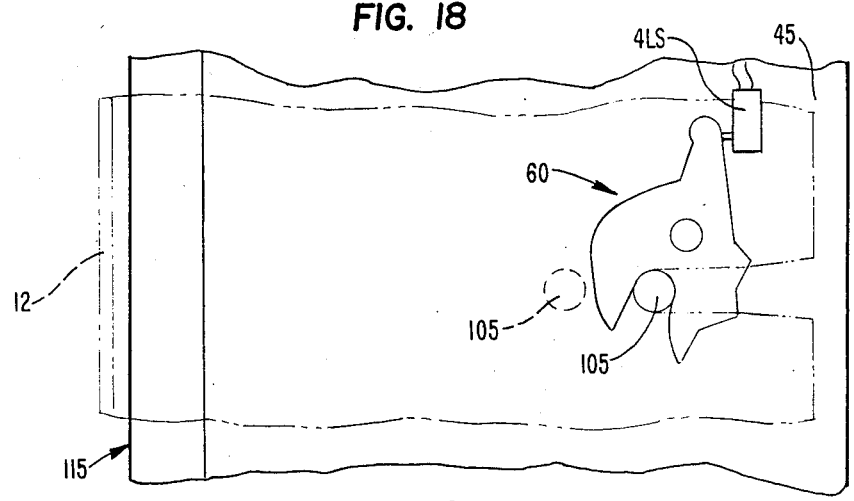

Referring to FIGS. 14–16, the various components 82–85 and 102–104 cooperate to form a unidirectional lock, shown generally at 110. The unidirectional lock 110 serves to prevent reverse rotation or back-driving of the striker pin 105 in the event that the fully closed door is impacted from the inside under high loads, for example a 2500 lb. striker pin crash worthiness side load established by governmental agencies and automobile manufacturers. As shown in FIG. 14, the striker pin 105 is extended to its fully open or unclamped position, awaiting both the arrival of the latch bolt mechanism 60 (FIG. 8) and the movement of the latch bolt mechanism to its latched condition prior to undergoing rotary motion which retracts the striker pin and moves the door to its fully closed, clamped position. This extended condition of striker pin 105 is also represented in FIGS. 17 and 18, wherein the latch bolt mechanism 60 is shown in its unlatched condition and about to engage the striker pin 105 in FIG. 17, and wherein the latch bolt mechanism 60 is shown in its latched condition in full engagement with striker pin 105 in FIG. 18. When the latch bolt mechanism 60 fully engages and latches on to striker pin 105, it actuates a limit switch 4LS which signals the electrical control system that the latch bolt mechanism 60 is fully latched on to the striker pin 105 and the electrical circuits, in turn, cause motor 1M to drive the striker pin 105 from its dotted line extended position, shown in FIG. 19, to its solid line, retracted, position shown in FIG. 19. This movement is occasioned by movement of the door 12 to its fully closed position, in which the door compresses the weather seal strip, shown generally at 115, against the vehicle body members constituting the frame of the door opening 19. It is also occasioned by clockwise rotation of the striker shaft 82 from the position shown in FIG. 14 to the position shown in FIG. 15, at which latter position the pawl 102 has dropped into place behind the ratchet tooth 83 and is abutted by the face 8 of the ratchet tooth. In this position should the fully closed door be impacted from the inside under a high load, for example during a vehicle crash, the unidirectional lock 110 will, by virtue of its pawl 102 being in face to face confronting engagement with the face 84 of ratchet wheel tooth 83, resist reverse rotation or back driving of the striker pin 105 to prevent accidental, unintended opening of the door. As shown in FIG. 16, the striker pin is being moved from its retracted position to its extended position by clockwise rotation of the shaft 82. This rotation is initiated by the electrical circuits of the powered door operating system after a door opening cycle has been initiated by the operator and the latch bolt mechanism 60 has cleared the striker pin 105, as will appear in greater detail hereinafter.

Figure 20:
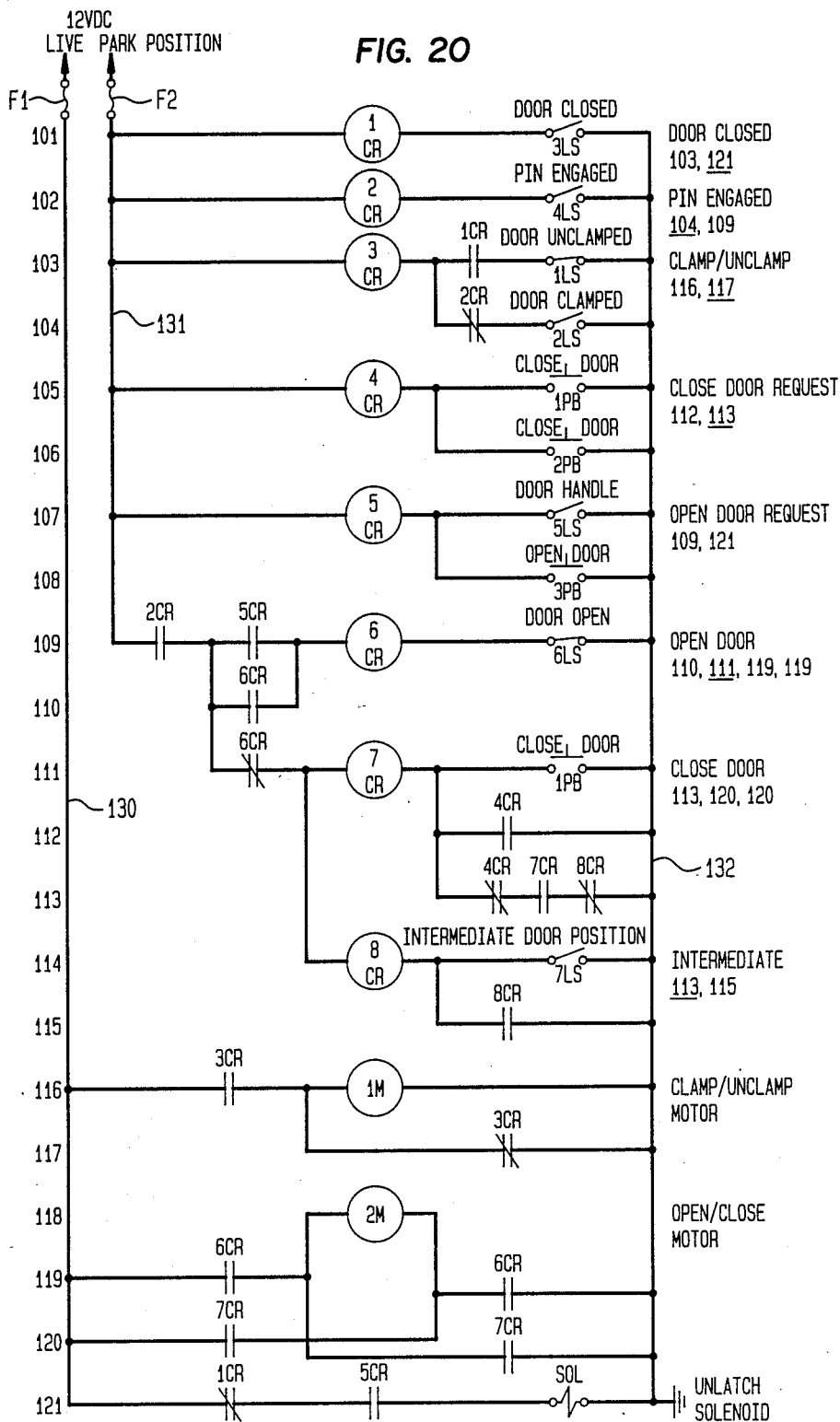

Referring now to FIG. 20, which comprises a circuit diagram of the electrical control system utilized in controlling the operation of the powered sliding door operating system, a line numbering system has been employed to facilitate the description of the electrical system. The line numbers have been listed on the left side of FIG. 20 and they run consecutively from line No. 101 through line No. 121. The line numbers on which the contacts of relays appear have been listed to the right of the relays that control them, and normally closed contacts are indicated by underlining in the listings. Thus, referring to FIG. 20, relay 1CR (line 101) is provided with two sets of contacts, a normally open set of contacts in line 103 and normally closed set of contacts in line 121.

Twelve volt DC voltage is brought in directly from the automobile battery (not shown) to the electrical control system of the powered sliding door operating system via a fuse F1 and a conductor 130. Twelve volt DC voltage is also brought in to the electrical control system through a transmission lever switch (not shown) via a fuse F2 and a conductor 131. The conductor 131 is energized only when the transmission lever is in either the park or neutral position. A conductor 132 is connected to the grounded side of the battery to complete the circuit across the electrical control system.

TABLE I below lists and describes the functions of the various push buttons, limit switches, solenoids and motors that are used in the electrical control system circuits in controlling the powered sliding door operating system. The table is added at this point to provide a convenient reference list for these components.

TABLE I

| Components | DESCRIPTION OF COMPONENTS Description |
|---|---|
| 1LS | Normally closed - opens when striker pin rotates to fully extended (unclamped position. |
| 2LS | Normally closed - opens when striker pin rotates into its retracted (clamped position. |
| 3LS | Normally closed - opens when door approaches nearly closed position and remains open while door is fully closed. |
| 4LS | Normally closed - opens when latch member moves to fully closed (latched) position. |
| 5LS | Normally open - closes when door handle is pulled open or when solenoid SOL is energized. |
| 6LS | Normally closed - opens when door reaches fully open position. |
| 7LS | Normally open - closes while door is in its intermediate position. |
| 1PB | Normally open - manually closed to close door from outside of vehicle. |
| 2PB | Normally open - manually closed to close door from inside rear of van. |
| 3PB | Normally open - manually closed by operator of vehicle to open door from the driver's station. |
| 4PB | Normally open - manually closed by operator to close sliding door from the driver's station. |
| SOL | A solenoid connected to the door opening mechanism for unlatching the latch bolt mechanism and holding the latch bolt mechanism open, while energized. |
| 1M | Motor for moving the striker pin between its extended and retracted position to move the door from its unclamped position to its clamped position. |
| 2M | Motor for moving the door between its fully open and nearly closed positions. |

Referring to FIG. 20 in conjunction with FIG. 8, the electrical circuits of the powered sliding door operating system are shown in the condition they assume when the door is in its fully closed, fully clamped condition. Starting from this condition, a full door opening and then a full door closing cycle will be considered.

With the door in the fully closed and clamped position, the operator manually actuates the door handle 50, closing limit switch 5LS (line 107), or presses push button 3PB (line 108). Accordingly, control relay 5CR (line 107) energizes closing its contacts both in line 109 and line 121. The closing of contact 5CR in line 109 preconditions control relay 6CR for subsequent energization when control relay 2CR energizes, and the closing of contacts 5CR in line 121 causes solenoid SOL to energize to mechanically hold the door handle 50 in the open position, retaining limit switch 5LS in its actuated condition and retaining its contacts 5LS in line 107 closed. The opening of the door handle 50 and energization of solenoid SOL cause the latch bolt mechanism 60 to unlatch which, in turn, causes limit switch 4LS (FIG. 17) to deactuate, closing its contacts 4LS in line 102. It should be noted at this time that the unlatching of the latch bolt mechanism frees the door to move from its clamped position, or fully closed position, to its unclamped position, or nearly closed position, due both to the resulting expansion of the compressed weather seal strip and to the door opening movement initiated via motor 2M, as described below.

The closing of contacts 4LS in line 102 causes control relay 2CR (line 102) to energize, opening its contacts 2CR in line 104 and closing its contacts 2CR in line 109. The opening of contacts 2CR in line 104 is without further effect at this time. The closing of contacts 2CR in line 109 causes control relay 6CR (line 109) to energize through the now closed contacts 5CR in line 109. Accordingly, contacts 6CR in line 110 close, bypassing the contacts of relay 5CR in line 109; contacts 6CR in line 111 open, without further effect at this time; and, the two sets of contacts 6CR in line 119 close, energizing motor 2M (line 118) to start driving the door from its fully or nearly closed position toward its fully open position.

As the door moves away from its nearly closed position toward its fully open position, limit switch 3LS actuates and its contacts 3LS (line 101) close, energizing relay 1CR (line 101). Accordingly, contacts 1CR in line 103 close, energizing control relay 3CR (line 103), and contacts 1CR in line 121 open, de-energizing solenoid SOL (line 121). Accordingly, the door handle resumes its unpulled condition and contacts 5LS (line 107) open, de-energizing control relay 5CR without further effect (since contacts 5CR in line 109 open but are bypassed by contacts 6CR in line 110, and since contacts 5CR in line 121 open but contacts 1CR of that line have previously been opened).

The aforesaid energization of control relay 3CR (line 103), due to the closing of contacts 1CR in line 103, causes contacts 3CR in line 116 to close and contacts 3CR in line 117 to open. Accordingly, motor 1M (line 116) becomes energized and starts rotating the striker pin 105 from its retracted position toward its fully extended position. During the rotation of motor 1M, limit switch contacts 2LS (line 104) close as the striker pin starts rotating out of its retracted position, but this is without further effect since relay 2CR is energized and its contacts in line 104 are open at this time. When the striker pin rotates to its fully extended (unclamped) position, limit switch contacts 1LS (line 103) open, de-energizing control relay 3CR (line 103). With the de-energization of control relay 3CR (line 103), its contacts 3CR in line 116 open and its contacts 3CR in line 117 close. Accordingly, the input side of motor 1M is de-energized and grounded, braking the motor and stopping the movement of the striker pin 105 with the striker pin in its extended (unclamped) position.

The continuing opening movement of the door causes the limit switch 7LS to actuate when the door reaches and goes through its intermediate position. Accordingly, contacts 7LS in line 114 close and then open again as the door movement continues past the intermediate position. The closing of contacts 7LS of line 114 is without further effect since relay 6CR (line 109) is energized at this time and its contacts 6CR in line 111 are open.

With the continuing opening movement of the door, the door eventually arrives at its fully open position at which time limit switch 6LS actuates, opening contacts 6LS in line 109 to de-energize control relay 6CR (line 109). Accordingly, the two sets of normally open contacts 6CR in line 119 open, deenergizing motor 2M, the normally open contacts 6CR in line 110 open without further effect, and the normally closed contacts 6CR in line close without further effect, but preconditioning line 111 for subsequent closing operations. The door thus is now in its fully open condition, with the latch bolt mechanism 60 unlatched and with the clamping mechanism 80 open, or unclamped, ready for a door closing cycle to be initiated.

To start the door closing cycle, one or another of the push buttons 1PB (line 105), 2PB (line 106) or 4PB (line 111) is depressed to close its corresponding contacts. Push buttons 1PB and 2PB, which are physically located adjacent to the door handle 50, must be held in the closed condition to maintain closing movement of the door. On the other hand, push button 4PB, which is controlled by the driver of the vehicle at the driver's location, only needs to be depressed once to initiate that portion of the door closing cycle which moves the door from its fully open position to its intermediate position. The closing operation of the door following depression of push button 4PB will be considered first, followed by a discussion of the closing operation initiated by limit switches 1PB and 2PB.

When push button 4PB is depressed, its contacts in line 111 close, energizing control relay 7CR (line 111). Accordingly, contact 7CR in line 113 close, locking relay 7CR in an energized condition independently of contacts 4PB in line 111, since contacts 4CR and 8CR in line 113 are closed at this time. In addition, the two sets of normally open contacts 7CR in line 120 close with the energization of relay 7CR to energize motor 2M with a polarity that causes the motor to drive the door in a closing direction, from its fully open position toward its intermediate position.

The initial closing movement of the door from its fully open position toward its intermediate position results in the limit switch 6LS deactuating, causing its contacts 6LS in line 109 to close without further effect since contacts 5CR and 6CR in lines 109 and 110, respectively, are open at this time. The door thus continues to move toward its immediate position and, upon arrival at the intermediate position, limit switch 7LS (line 114) closes, energizing control relay 8CR (line 114) through the now-closed contacts 2CR of line 109 and the closed contacts 6CR of line 111. Contacts 8CR (line 115) thus close, providing a path to ground for relay 8CR that is independent of limit switch 7LS of line 114. In addition, contacts 8CR in line 113 open, de-energizing control relay 7CR (line 111) and opening its contacts 7CR in line 113 without further effect and opening its two sets of contacts 7CR in line 120. The opening of the two sets of contacts 7CR in line 120 de-energizes the motor, stopping the door at the intermediate position.

Returning now to a consideration of the manner in which the door is moved from its fully open position to its intermediate position via the use of push buttons 1PB (line 105) and 2PB (line 106), when either of these two push buttons is depressed control relay 4CR (line 105) energizes during the time that one or the other of the two push buttons is depressed. Contacts 4CR in line 112 thus close while relay 4CR is energized, in turn, energizing control relay 7CR of line 111 and motor 2M via the two sets of contacts 7CR in line 120. When the depressed one of the two push buttons 1PB and 2PB is released during the movement of the door from its fully open position to its intermediate position, control relay 4CR (line 105) deenergizes, opening its contacts 4CR in line 112 to de-energize control relay 7CR of line 111 and motor 2M, in turn, via the opening of the two sets of contacts 7CR in line 120. Accordingly, it will be seen that to move the door between its fully open position and its intermediate position using push buttons 1PB and 2PB requires that these push buttons be held in during the entire time that the door is moving between these positions. In effect, these push buttons represent a "jog" control for the door in its movement from its fully open position to its intermediate position. When the door reaches its intermediate position under the control of push button 1PB or 2PB, the limit switch 7LS closes, energizing control relay 8CR (line 114). Contacts 8CR (line 113) thus open, without further effect, and contacts 8CR (line 115) close, providing an alternate connection to ground for relay 8CR that bypasses limit switch 7LS of line 114.

Accordingly, whether controlled by push button 4PB or by push buttons 1PB or 2PB, the door arrives at its intermediate position and the electrical circuits assume a common condition, awaiting further closing signals at that position. At this time, further closing movement of the door under the control of any of the push buttons 1PB, 2PB or 4PB requires the respective button to be maintained in its depressed condition to continue moving the door toward its nearly closed position. This is due to the fact that control relay 8CR (line 114) is energized and its contacts 8CR in line 113 are open, preventing energization of relay 7CR through any path other than through the closing of contacts 4PB in line 111 or through the closing of contacts 4CR in line 112, with the latter being controlled only by the depression of push buttons 1PB or 2PB.

Assuming that push button 4PB is depressed to continue the closing movement of the door from its intermediate position towards its nearly closed position, control relay 7CR (line 111) energizes and, in turn, energizes motor 2M via its two sets of contacts 7CR in line 120. Accordingly, while push button 4PB is being depressed, the door continues to move toward its nearly closed position. As it approaches that position, limit switch 3LS (line 101) opens, de-energizing control relay 1CR (line 101) and causing its contacts 1CR in line 103 to open and its contacts 1CR in line 121 to close. The closing of contacts 1CR in line 121 is without further effect since contacts 5CR of that line are already open, and the opening of contacts 1CR in line 103 is without further effect since the contacts of the limit switch 1LS in that line are already opened. The continued movement of the door toward its nearly closed position causes the latch bolt mechanism 60 to engage and then latch onto the extended striker pin 105 of the clamping mechanism 80. Accordingly, limit switch 4LS (line 102) actuates, opening its contacts in line 102 and de-energizing control relay 2CR (line 102). As a result of this, contacts 2CR in line 109 open, deenergizing relays 7CR (line 111) and 8CR (line 114). Accordingly, the two sets of contacts 7CR in line 120 open, stopping the motor 2M with the door in its nearly closed position. The contacts of relay 8CR in line 113 close without further effect and the contacts 8CR in line 115 open without further effect. In addition the aforesaid de-energization of control rely 2CR (line 102) causes its contacts 2CR in line 104 to close, energizing control relay 3CR (line 103) through the now-closed contacts 2LS in line 104. The energization of control relay 3CR (line 103) causes its normally open contacts in line 116 to close and its normally closed contacts in line 117 to open. Accordingly, motor 1M becomes energized and starts driving the striker pin 105 of the clamping mechanism 80 from its extended position to its retracted position, thereby moving the door from its unclamped condition to its fully clamped position.

The initial movement of the striker pin 105 from its extended position toward its retracted position causes the contacts of limit switch 1LS in line 103 to close without further effect since contacts 1CR in line 103 are open at this time. When the striker pin reaches its fully retracted position, and the door is in its fully clamped condition, the limit switch contacts 2LS of line 104 open, de-energizing control relay 3CR (line 103). Accordingly, contacts 3CR of line 116 open and contacts 3CR of line 117 close, grounding the input to motor 1M of line 116 and causing the motor to brake to a stop with the striker pin in its fully retracted position and the door fully clamped. At this point the door is fully closed and the electrical circuits are back to the condition they were in when this description of a complete opening and closing cycle of the door was started.

Referring to FIGS. 8 and 12, a multi-wire cable 135 may be employed to interconnect the electrical components inside the door 12 (e.g., limit switches 4LS and 5LS, push buttons 1PB and 2PB, solenoid SOL and, in the alternate embodiment, motor 2M) with the remaining electrical components of FIG. 20. Cable 135 exits from door 12 Via an aperture 136 and is supported along arm 15. At the end of arm 15 it proceeds rearwardly along the upper forward guide member 17 to a spring driven take-up reel 137 on which it winds during opening movement of the door and from which it unwinds during closing movement of the door. Suitable slip rings (not shown) are provided on the take-up reel 137, in a known manner, to connect the various wires of the cable 135 to their corresponding lines of the electrical control system of FIG. 20. The various control relays of the electrical control system, and the wires associated therewith, are preferably housed in an electrical cabinet, shown generally at 140.

From the foregoing detailed description, it is apparent that the present invention provides an improved powered sliding door operator and powered sliding door operating system for van type vehicles. The sliding door is moved with low momentum by the powered sliding door operator from its fully open position to its nearly closed position, and vice versa, so as to reduce the safety hazards encountered in existing manual sliding doors and existing powered sliding door operators. In addition the powered sliding door operator system provides for the complete closing of the sliding door in a safe, slow, controlled manner, and the manual effort required to open and close the sliding door utilizing the foregoing power sliding door operator and system is substantially reduced or eliminated. Moreover, in the event that the powered sliding door operator or system is not functional, due to a vehicle accident or a system failure or the like, it is apparent that the powered door operator and system of the present invention allows near-normal manual operation for opening and closing the sliding door, albeit that the manual closing operation requires the high momentum slamming movement of conventional sliding door closing arrangements. In addition, the present invention provides a powered sliding door operating system which can be actuated either from the vehicle driver's seat or from the sliding door itself.

While there have been shown and described what are presently considered to be the preferred embodiments of this invention, it will be obvious to those skilled in the art that various additional changes and modifications may be made without departing from the broader aspects of this invention. It is, therefore, aimed in the appended claims to cover all such changes and modifications as fall within the true spirit and scope of this invention.

What is claimed is:

1. A door operator for a slide door that is slidingly supported relative to a door operating in a side panel of a vehicle body, said door being supported adjacent its forward end on at least one forward guide member and being supported adjacent its rear end on a rear guide member, said guide members guiding said door through an initial closing movement generally parallel to said side panel and through at least a portion of its final closing movement generally toward the plane of said door opening, said door operator comprising means including a cable member carried on the outboard side of said side panel and coupled to the rear end of said door for driving said door along said guide members to thereby move said door through said initial and final closing movements.

2. A door operator according to claim 1, wherein said cable member is supported on said side panel adjacent to said rear guide member.

3. A door operator for a slide door that is slidingly supported relative to a door opening in a side panel of a vehicle body, said door being supported adjacent its forward end on at least one curved forward guide member by a forward bracket and roller assembly and being supported adjacent its rear end on a curved rear guide member by a rear bracket and roller assembly, said guide members guiding said door through an initial closing movement generally parallel to said side panel and through at least a portion of its final closing movement generally toward the plane of said door opening, movement generally away from the plane of said door operator comprising means including a cable member carried on the outboard side of said side panel and coupled to said rear bracket and roller assembly for driving said rear bracket and roller assembly along said rear guide member to thereby move said door through said initial and final closing movements.

4. A door operator for a slide door that is slidingly supported relative to a door opening in a side panel of a vehicle body, said door being supported adjacent its forward end on at least one curved forward guide member by a forward bracket and roller assembly and being supported adjacent its rear end on a curved rear guide member by a rear bracket and roller assembly, said guide members guiding said door through an initial closing movement and a final opening movement generally parallel to said side panel, through at least a portion of its final closing movement generally toward the plane of said door opening and through at least a portion of its initial opening movement generally away from the plane of said door opening, said door operator comprising means including a cable member supported in said curved rear guide member and coupled to said rear bracket and roller assembly for driving said rear bracket and roller assembly along said rear guide member to thereby move said door through said initial and final closing movements.

5. A door operator for a slide door that is slidingly supported relative to a door opening in a side panel of a vehicle body, said door being supported adjacent its forward end in at least one curved forward guide member by a forward bracket and roller assembly and being supported adjacent its rear end in a curved rear guide member by a rear bracket and roller assembly, said guide members guiding said door through an initial closing movement and a final opening movement generally parallel to said side panel, through at least a portion of its initial opening movement generally away from the plane of said door opening and through at least a portion of its final closing movement generally toward the plane of said door opening, said door operator comprising means including a cable member carried on the outboard side of said side panel and coupled to the rear end of said door for driving said bracket and roller assemblies along said guide members to thereby move said door through said initial and final opening and closing movements.

6. A door operator according to claim 5, wherein said cable member is supported on said side panel adjacent to said curved rear guide member.

7. A door operator according to any one of claims 3-6, and further including motor means coupled to said cable member for moving said door along said guide members.

8. A door operator according to claim 7, and further including a first pulley member rotatably supported on said side panel adjacent one end of said rear guide member and a second pulley member rotatably supported on said side panel adjacent another end of said rear guide member, and wherein said cable member is entrained about said pulley members, said motor means is carried by said side panel, one of said pulley members is rotatably connected to said motor means, and said rear bracket and roller assembly is fixedly connected to said cable member, so that rotation of said motor means causes said rear bracket and roller assembly to slidably move said door relative to said side panel.

9. A door operator according to claim 7, and further including first and second pulley members rotatably supported on said rear bracket and roller assembly, and a third pulley member coupled to and driven by said motor means, and wherein said motor means is carried by said sliding door, said cable member includes first and second ends thereof fixedly connected to said vehicle body adjacent respective opposite ends of said rear guide member, and said cable member is entrained about said first, second and third pulley members, so that rotation of said motor means causes said rear bracket and roller assembly to slidably move said door relative to said side panel.

10. A door operator according to any one of claims 3-6, wherein said sliding door includes a latch bolt member adjacent its rear end that is movable between an unlatched position and a latched position upon engagement with a striker pin, and wherein said door operator further includes a first motor means coupled to said cable member for moving said slide door along a major portion of said guide members, between a fully open position and a nearly closed position that is closely adjacent to a fully closed position, and a second motor means carried by said vehicle body at the rear of said door opening and including an eccentrically mounted striker pin thereon engageable by said latch member when said door is in its nearly closed position for moving said door from its nearly closed position to its fully closed position.

11. A door operator according to claim 10, and further including a first pulley member rotatably supported on said side panel adjacent one end of said rear guide member and a second pulley member rotatably supported on said side panel adjacent another end of said rear guide member, and wherein said cable member is entrained about said pulley members, said first motor means is carried by said side panel, one of said pulley members is rotatably connected to said first motor means, and said rear bracket and roller assembly is fixedly connected to said cable member so that rotation of said first motor means causes said rear bracket and roller assembly to slidably move said door relative to said side panel, between its nearly closed position and its fully open position.

12. A door operator according to claim 10, and further including first and second pulley members rotatably supported on said rear bracket and roller assembly, and a third pulley member coupled to and driven by said first motor means, and wherein said first motor means is carried by said sliding door, said cable member includes first and second ends thereon fixedly connected to said vehicle body adjacent to respective opposite ends of said rear guide member and is entrained about said first, second and third pulley members so that rotation of said first motor means causes said rear bracket and roller assembly to slidably move said door relative to said side panel, between its nearly closed position and its fully open position.

13. A door operating system for a door that is slidingly supported relative to a door opening in a side panel of a vehicle body, said door being supported adjacent its forward end on at least one forward guide member carried by said vehicle body and being supported adjacent its rear end on a rear guide member carried by said vehicle body, said guide members guiding said door through (i) an initial closing movement generally parallel to said side panel, (ii) a final opening movement generally parallel to said side panel, (iii) at least a portion of its final closing movement generally toward the plane of said door opening, and (iv) at least a portion of its initial opening movement generally away from the plane of said door opening, said door including a latch bolt member carried adjacent the rear end thereof and movable between latched and unlatched positions, said door operating system comprising drive means including a cable member coupled to the rear end of said door for moving said door along said guide members and through said initial and final closing movements, and clamping means including a rotatable striker plate mounted on said vehicle body and having an eccentrically mounted striker pin thereon engageable by said latch bolt member of said door for clamping said door to said vehicle body with said door in a finally closed position in said door opening.

14. A door operating system according to claim 13, wherein said clamping means moves said door between an unclamped position thereof and a clamped position thereof, wherein said drive means moves said door between a fully open position, an intermediate position and a nearly closed position, and wherein said nearly closed position of said door corresponds to said unclamped position of said door.

15. A door operating system according to claim 14, wherein said clamping means further includes means for unidirectionally rotating said striker plate to move said striker pin between extended and retracted positions corresponding respectively to said unclamped and clamped positions of said door.

16. A door operating system according to claim 15, and further including circuit means connected to said drive means and to said clamping means for controlling operation of said door operating system, said circuit means including solenoid means coupled to said latch bolt member and operative, when energized, to move said latch bolt member from its latched position to its unlatched position for permitting said door to be moved from its clamped position to its unclamped position, manually operable switch means coupled both to said latch solenoid and to said drive means for energizing said solenoid means and said drive means thereby to move said door from its clamped position to its fully open position, and means responsive to the arrival of said door at its fully open position for de-energizing said drive means to stop said door at its fully opened position.

17. A door operating system according to claim 16, wherein said circuit means further includes means responsive to opening movement of said door from its unclamped position toward its intermediate position for actuating said striker plate rotating means to move said striker pin from its retracted position to its extended position.

18. A door operating system according to claim 15, and further including circuit means connected to said drive means and to said clamping means for controlling operation of said door operating system, said circuit means including a plurality of manually operable switch means for initiating a plurality of different signals in said door operating system to start closing said door when it is in other than its fully closed position, switch means responsive to said signals and, in the case of at least one of said plurality of signals, thereafter independent of said signal for energizing said drive means to move said door from an open position beyond said intermediate position to said intermediate position, means responsive to the arrival of said door at said intermediate position for de-energizing said drive means, and means responsive to actuation of at least one of said manually operable switch means and operable only during the time said manually operable switch means is actuated for moving said door from said intermediate position to said nearly closed, unclamped position.

19. A door operating system according to claim 18, wherein said latch bolt member engage said striker pin and is moved to its latched position by said striker pin as said door approaches and moves into its nearly closed, unclamped position, and further including means responsive to the movement of said latch bolt member to its latched position and operative to energize said striker plate rotating means upon arrival of said latch bolt member at its latched position for moving said striker pin from its extended position to its retracted position thereby to move said door from its unclamped position to its clamped position.

20. A door operating system according to claim 19, further including switch means actuated upon arrival of said striker pin at its retracted position and operative to deenergize said striker plate rotating means for stopping the movement of said door at its clamped position.

* * * * *

UNITED STATES PATENT AND TRADEMARK OFFICE
CERTIFICATE OF CORRECTION

PATENT NO. : 4,887,390

DATED : December 19, 1989

INVENTOR(S) : Boyko, et al

It is certified that error appears in the above-identified patent and that said Letters Patent is hereby corrected as shown below:

Column 17, line 10, delete "operating in" and insert --opening--.

Column 17, line 38, delete "movement generally away from the plane of".

Signed and Sealed this

Eleventh Day of June, 1991

Attest:

HARRY F. MANBECK, JR.

Attesting Officer

Commissioner of Patents and Trademarks